United States Patent [19]

Kennedy

[11] Patent Number: 5,037,148

[45] Date of Patent: Aug. 6, 1991

[54] BODY SIDE GUARD

[76] Inventor: Alberto Kennedy, 8615 NW. 8th St., Apt. 314, Miami, Fla. 33172

[21] Appl. No.: 596,956

[22] Filed: Oct. 15, 1990

[51] Int. Cl.⁵ ............................................. B60R 19/02
[52] U.S. Cl. .................................................. 293/128
[58] Field of Search ................... 296/128, 102; 428/31

[56] References Cited

U.S. PATENT DOCUMENTS

| | | | |
|---|---|---|---|
| 3,309,129 | 3/1967 | Newman | 293/128 |
| 3,506,294 | 4/1970 | Newman | 293/128 |
| 3,517,473 | 6/1970 | Kistner et al. | 293/128 |
| 3,610,669 | 10/1971 | Morrissey, Jr. | 293/128 |
| 4,235,466 | 11/1980 | Mandrik | 293/128 |

*Primary Examiner*—Robert R. Song
*Attorney, Agent, or Firm*—J. Sanchelima

[57] ABSTRACT

A body side guard for vehicles having an elongated holder assembly rigidly mounted to the side of the vehicle being protected. The holder assembly has a longitudinal slot and an elongated foldable guard member for protecting the vehicle. The guard members have a substantially flat shape and are cooperatively and slidably received by the longitudinal slot to snuggly engage therewith. A locking mechanism on each guard member releasably holding it in place with respect to the holder assembly.

9 Claims, 2 Drawing Sheets

BODY SIDE GUARD

BACKGROUND OF THE INVENTION

1. Field of the Invention

The present invention relates to body side guard devices, and more particularly, to such devices that are placed on the sides of vehicles.

2. Description of the Related Art

A number of devices have been used in the past to protect vehicles from being damaged, typically, by other vehicles. One of such examples is the bumper guard assembly described in U.S. Pat. No. 3,506294 issued to Newman. Also, the patent issued to Kistner, U.S. Pat. No. 3,517,473 discloses one of these devices. These two devices and others are designed to protect the automobiles with the minimum detraction from the design appeal of the vehicle. However, they are all permanently mounted and the removable is rather elaborous and their effectiveness if limited.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a body side guard that effectively protects the vehicle from damage typically resulting from adjacent automobiles when the doors are open in a parking lot.

It is another object of this present invention to provide such a device that can be readily removed, if desired by the user, and stored in a compact form.

It is still another object of this invention to provide a guard that extends outwardly substantially in order to effectively protect the vehicle.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
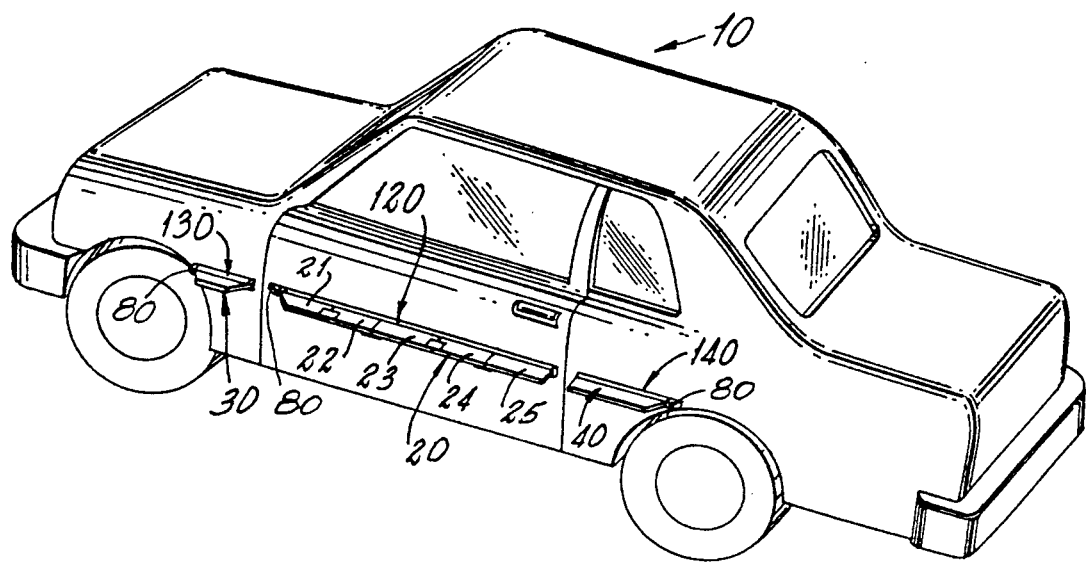
FIG. 1 represents an isometric view of a vehicle wherein the present invention has been incorporated.

Referring now to FIG. 1, where the present invention is generally referred to with numeral 10, it can be observed that it comprises preferably of three members: central guard member 20, front guard member 30 and rear guard member 40 and these members are foldable and substantially flat. In the preferred embodiment, it has been found that mebers 20; 30 and 40 provide sufficient protection to the sides of a vehicle when they are 2 inches (5 cm.) wide. Wider dimensioning of course, provide better protection but make the guard members more difficult to store. These members are removably mounted in their respective holder: central holder member 120, front holder member 130 and rear holder member 140.

Figure 5:
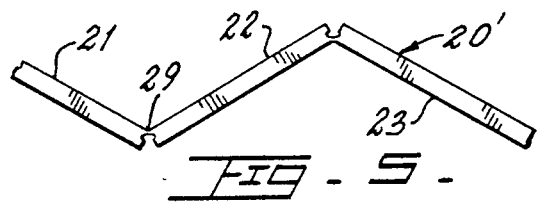
FIG. 5 is an alternate embodiment for the hingedly mounted section of the guard members.
Figure 2:
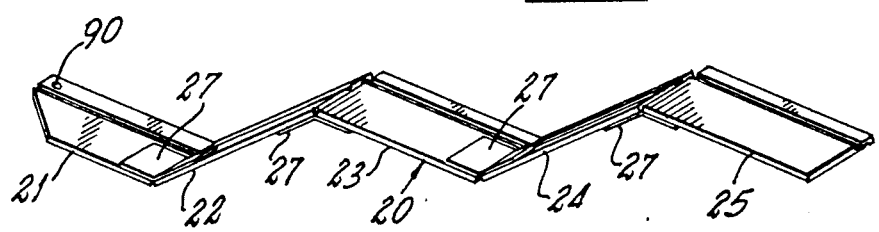
FIG. 2 shows an isometric view of the central guard member used in the preferred embodiment.
Figure 3:
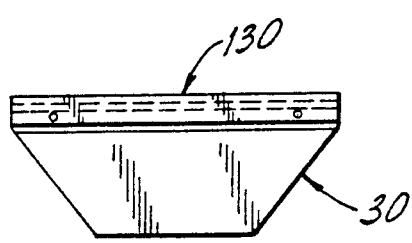
FIG. 3 illustrates a top view of the front guard member used in the preferred embodiment.
Figure 4:
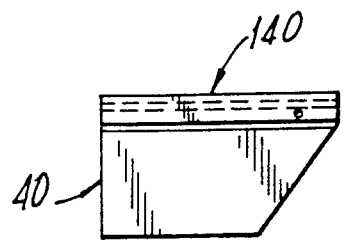
FIG. 4 is a representation of the top view of the rear guard member used in the preferred embodiment.
Figure 9:
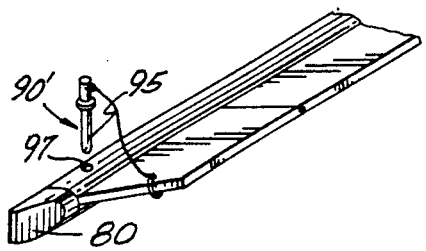
FIG. 9 is an alternate embodiment for the locking mechanism used comprising of a removable pin.

Central guard member 20 comprises several sections 21, 22, 23, 24 and 25 that are hingedly mounted to each other. In FIG. 2, it can be observed that contiguous sections are joined to each other with tape 27 that implements the hinge function. Tape 27 is preferably a flexible tape with an adhesive on the side that comes in contact with the sections. Another way of implementing this hinge function is shown in FIG. 5 where alternate guard member 20' is made out of a flexible plastic material with a sufficiently reduced transversal portion 29 delineating where the sections end and start. This reduction of the thickness of the material permits the implementation of the desired hinge function provided by tape 27. There is no set number of sections that should be utilized but it is clear that the more sections a guard has, the more compact it can be made when folded for storage.

Figure 6:
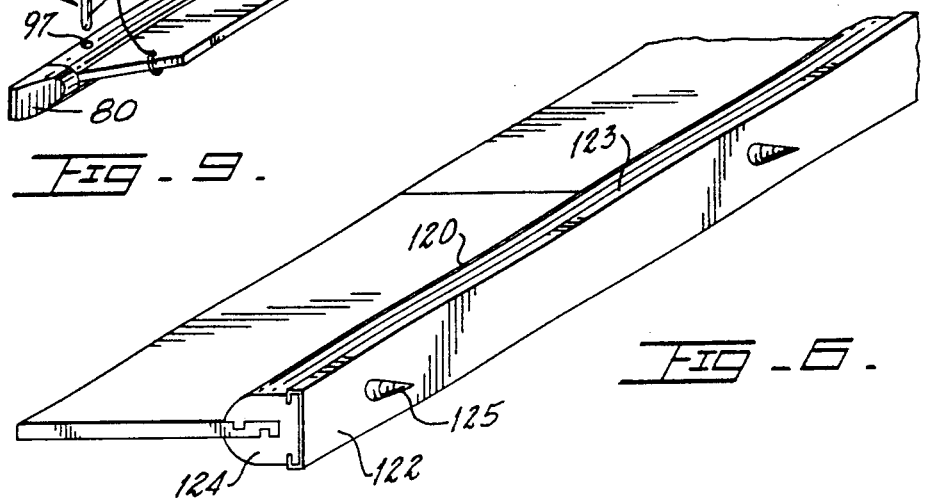
FIG. 6 illustrates an isometric view of a portion of the central guard member and holder thereof.
Figure 7:
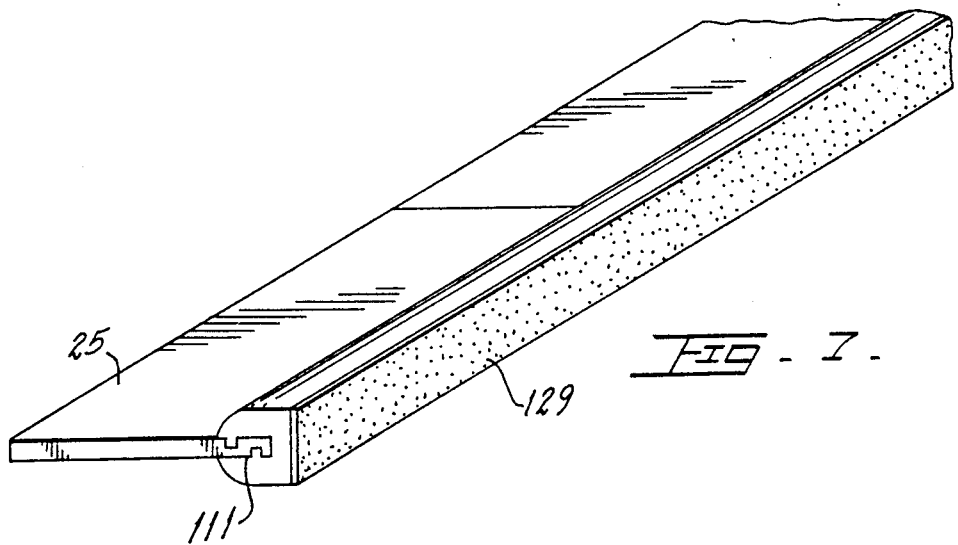
FIG. 7 is the same section represented in FIG. 1 wherein the holder includes a surface with an adhesive for its mounting to the body side of a vehicle.

In FIGS. 6 and 7, two embodiments for holder members 120, 130 and 140 are shown, and only holder member 120 is referenced but it applies for the other members 130 and 140 as well. In FIG. 6, holder member 120 is shown to include channel trim member 122 which receives guarding member 124 and holding it in place through the gripping action of inwardly extending flange 123 on guiding member 124. Screws 125 are used to fasten channel trim member 122 to the vehicle being protected. In FIG. 7, guiding member 124 is mounted to the side of a vehicle with adhesive film 129. Under both, FIGS. 6 and 7, guiding member 124 includes longitudinal slot 111 that cooperatively and slidably receives central guard member 20. Similar engagements are used for member 30 and 40.

Figure 8:
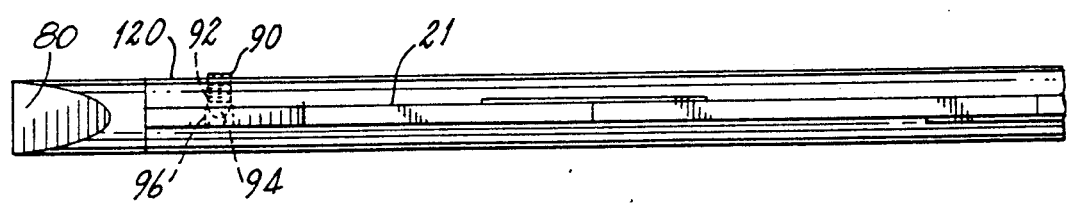
FIG. 8 is a side elevational view of the front part of the central guard showing a locking mechanism comprising of a spring loaded ball plug assembly.

FIG. 8 shows holder member 120 and section 21 locked in place by locking mechanism 90. Locking mechanism 90 is shown to include spring 92 and steel ball 94 that is spring loaded forcing it downwardly against cavity 96 and it includes pin 95 that is insertable in through opening 97 and into a cavity similar to 96 in member 20; 30 or 40.

End caps 80 are preferably used at the ends of holder members 120; 130 and 140 in order provide the aesthetic finish for the present invention. End caps 80 can mount on channel trim member 122 or through an adhesive material directly of the side of a vehicle being protected.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A body side guard for vehicles, comprising:
   A. an elongated holder assembly rigidly mounted to the side of said vehicle being protected and said holder assembly including a longitudinal slot;
   B. elongated guard means for protecting said vehicle and having a substantially flat shape, and said elongated guard means being cooperatively and slidably received by said longitudinal slot to snuggly engage therewith and said elongated guard means includes a plurality of foldable sections that are contiguously hingedly connected to each other.

2. The body side guard set forth in claim 1 wherein said elongated guard means include a flexible tape connecting said contiguous sections thereby implementing said hinged connection.

3. The body side guard set forth in claim 2 further including locking means for keeping said elongated guard means securely mounted to said elongated holder assembly.

4. The body side guard set forth in claim 3 wherein said locking means includes a spring biased within said holder assembly and a cooperative cavity in said elongated guard means thereby keeping said guard means releasably locked in place.

5. The body side guard set forth in claim 4 wherein said locking means includes a locking pin member, a cooperative opening through said holder assembly and a cooperating cavity in said guard means.

6. The body side guard set forth in claim 2 wherein said guard means is made out of a substantially flexible material that includes a transversal portion wherein the thickness is reduced sufficiently to implement said hinged connection.

7. The body side guard set forth in claim 6 further including locking means for keeping said elongated guard means securely mounted to said elongated holder assembly.

8. The body side guard set forth in claim 7 wherein said locking means includes a spring biased ball member within said holder assembly and a cooperative cavity in said elongated guard means thereby keeping said guard means releasably locked in place.

9. The body side guard set forth in claim 7 wherein said locking means includes a locking pin member, a cooperative opening through said holder assembly and a cooperating cavity in said guard means.

* * * * *